US011159681B2

(12) United States Patent
Ramprasad

(10) Patent No.: US 11,159,681 B2
(45) Date of Patent: Oct. 26, 2021

(54) WIRELESS ACCOUNT MANAGEMENT APPLICATION FOR A WIRELESS DEVICE

(71) Applicant: TracFone Wireless, Inc., Miami, FL (US)

(72) Inventor: Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 16/847,900

(22) Filed: Apr. 14, 2020

(65) Prior Publication Data

US 2020/0244811 A1 Jul. 30, 2020

Related U.S. Application Data

(63) Continuation of application No. 16/666,779, filed on Oct. 29, 2019, now Pat. No. 10,623,583, which is a
(Continued)

(51) Int. Cl.
*H04M 15/00* (2006.01)
*H04W 4/24* (2018.01)
*G06F 3/0481* (2013.01)
*G06F 3/0484* (2013.01)
(Continued)

(52) U.S. Cl.
CPC .......... *H04M 15/46* (2013.01); *G06F 3/0481* (2013.01); *G06F 3/04842* (2013.01); *G06Q 20/28* (2013.01); *G06Q 20/342* (2013.01); *G06Q 30/0267* (2013.01); *H04M 15/58* (2013.01); *H04M 15/60* (2013.01);
(Continued)

(58) Field of Classification Search
CPC ......... H04W 4/24; H04W 8/18; H04W 12/06; H04W 8/20; H04W 24/02; H04M 15/80; H04M 15/00; H04M 2215/0188; H04M 15/8044; H04M 15/41; H04M 15/66; H04M 15/64; H04M 15/65; H04M 15/43;
(Continued)

(56) References Cited

U.S. PATENT DOCUMENTS 6,564,047 B1 5/2003 Steele et al.
7,958,029 B1 6/2011 Bobich et al.
(Continued)

*Primary Examiner* — Kwasi Karikari
(74) *Attorney, Agent, or Firm* — BakerHostetler

(57) ABSTRACT

A method for displaying wireless service usage information and account information using an account management application operating on a wireless device includes receiving, at the account management application operating on the wireless device and from a tracking module, wireless service usage information for a wireless subscriber associated with the wireless device, the wireless service usage information including one or more units of wireless services that the wireless subscriber has used, receiving, at the account management application operating on the wireless device and from a service provider over a wireless network, account information associated with the wireless subscriber associated with the wireless device, the service provider being different from the wireless device and the wireless network, and enabling presentation, on a display of the wireless device, of the account management application including the wireless service usage information and the account information for the wireless subscriber associated with the wireless device.

20 Claims, 9 Drawing Sheets

Related U.S. Application Data continuation of application No. 16/224,251, filed on Dec. 18, 2018, now Pat. No. 10,462,305, which is a continuation of application No. 15/156,881, filed on May 17, 2016, now Pat. No. 10,158,763, which is a continuation of application No. 14/218,266, filed on Mar. 18, 2014, now Pat. No. 9,344,583.

(60) Provisional application No. 61/786,804, filed on Mar. 15, 2013.

(51) Int. Cl.
    *G06Q 20/28*      (2012.01)
    *G06Q 20/34*      (2012.01)
    *G06Q 30/02*      (2012.01)
    *H04W 8/20*      (2009.01)

(52) U.S. Cl.
    CPC .......... *H04M 15/723* (2013.01); *H04M 15/83* (2013.01); *H04W 4/24* (2013.01); *H04W 8/205* (2013.01)

(58) Field of Classification Search
    CPC ....... H04M 15/852; H04M 2215/0164; H04M 15/75; H04L 12/14; H04L 67/306; H04L 67/34
See application file for complete search history.

(56) References Cited

U.S. PATENT DOCUMENTS

| | | |
|---|---|---|
| 8,422,988 B1 | 4/2013 | Keshav |
| 2002/0107795 A1 | 8/2002 | Minear et al. |
| 2002/0151293 A1 | 10/2002 | Tysor |
| 2003/0220994 A1 | 11/2003 | Zhu |
| 2004/0209595 A1 | 10/2004 | Bekanich |
| 2007/0149252 A1 | 6/2007 | Jobs et al. |
| 2008/0167017 A1 | 7/2008 | Wentker et al. |
| 2009/0054030 A1 | 2/2009 | Golds |
| 2009/0068984 A1 | 3/2009 | Burnett |
| 2009/0089165 A1 | 4/2009 | Sweeney |
| 2009/0144146 A1 | 6/2009 | Levine et al. |
| 2009/0181641 A1 | 7/2009 | Fiatal |
| 2009/0203352 A1 | 8/2009 | Fordon et al. |
| 2011/0275344 A1* | 11/2011 | Momtahan .......... H04L 12/1492 455/405 |
| 2012/0089727 A1 | 4/2012 | Raleigh et al. |
| 2012/0158947 A1 | 6/2012 | Hassan et al. |
| 2012/0202449 A1* | 8/2012 | Meyer .................. H04M 15/51 455/405 |
| 2012/0276867 A1* | 11/2012 | Mcnamee .......... H04L 12/1407 455/406 |
| 2013/0149994 A1 | 6/2013 | Gaddam et al. |

\* cited by examiner

WIRELESS ACCOUNT MANAGEMENT APPLICATION FOR A WIRELESS DEVICE

CROSS-REFERENCE TO RELATED APPLICATIONS

This application is a continuation of U.S. patent application Ser. No. 16/666,779 filed Oct. 29, 2019, now U.S. Pat. No. 10,623,583 issued on Apr. 14, 2020; which is a continuation of U.S. patent application Ser. No. 16/224,251 filed Dec. 18, 2018, now U.S. Pat. No. 10,462,305 issued on Oct. 29, 2019; which is a continuation of U.S. patent application Ser. No. 15/156,881 filed May 17, 2016, now U.S. Pat. No. 10,158,763 issued on Dec. 18, 2018; which is a continuation U.S. patent application Ser. No. 14/218,266 filed Mar. 18, 2014, now U.S. Pat. No. 9,344,583 issued on May 17, 2016, which claims the benefit from U.S. Provisional Application No. 61/786,804 filed on Mar. 15, 2013, which are all hereby incorporated by reference in their entirety for all purposes as if fully set forth herein.

TECHNICAL FIELD

The following disclosure generally relates to managing a subscriber's wireless account using an application for a wireless device and, more particularly, relates to tracking usage and enabling purchase of various wireless services using an application installed on the wireless device.

BACKGROUND

Wireless services, such as cellular or mobile phone services, typically include voice services, Short Message Service ("SMS") services, and data services. A wireless service provider typically bundles a particular number of voice minutes, a particular number of SMS messages, and an amount of data transfer for a prepaid or postpaid monthly wireless plan. A subscriber may purchase a bundle appropriate for his/her usage. When the subscriber places or receives a call, sends or receives an SMS message, and/or uploads or downloads data from his/her wireless device, appropriate units of usage are deducted from the subscriber's monthly wireless plan.

To initially purchase a bundle of wireless services, a subscriber typically visits a physical location, calls customer support, and/or visits a website operated by the wireless service provider or a third party. The subscriber then selects a bundle of usage appropriate for his/her needs. The amount of usage is credited to the subscriber's account and the wireless service is made available for use by the subscriber. In order to purchase additional usage or change his/her monthly wireless plan, the subscriber can again visit the physical location, call customer support, and/or visit a website operated by the wireless service provider or third party. However, visiting a physical location or calling customer support to purchase additional usage is time consuming for the subscriber and not available at any time. Using a website to purchase additional usage requires that the subscriber recalls or searches for the address of the website and navigates through a series of webpages.

Currently, many wireless devices use applications specific to the operating system of the wireless device to perform a multitude of tasks, such as playing games, editing documents, checking email, and purchasing goods and/or services. Such applications are readily accessible on home pages of the wireless devices and enable a user of the wireless device to quickly perform popular functionalities. For example, the user can quickly purchase a good and/or service of interest by using a particular merchant's mobile application.

Therefore, to improve a wireless subscriber's experience in tracking and purchasing wireless services, a new wireless account management application for a wireless device is needed.

SUMMARY

In one aspect a method for displaying wireless service usage information and account information using an account management application operating on a wireless device includes receiving, at the account management application operating on the wireless device and from a tracking module locally stored on the wireless device, wireless service usage information for a wireless subscriber associated with the wireless device, the wireless service usage information including one or more units of wireless services that the wireless subscriber has used, receiving, at the account management application operating on the wireless device and from a service provider over a wireless network, account information associated with the wireless subscriber associated with the wireless device, the service provider being different from the wireless device and the wireless network, and enabling presentation, on a display of the wireless device, of the account management application including the wireless service usage information and the account information for the wireless subscriber associated with the wireless device.

Details of one or more implementations of a wireless account management application for a wireless device are set forth in the accompanying drawings and the description below. Other aspects of the wireless account management application for a wireless device will be apparent from the description and drawings, and from the claims.

DESCRIPTION OF DRAWINGS

Like reference symbols indicate like elements throughout the specification and drawings.

DETAILED DESCRIPTION

Figure 1:
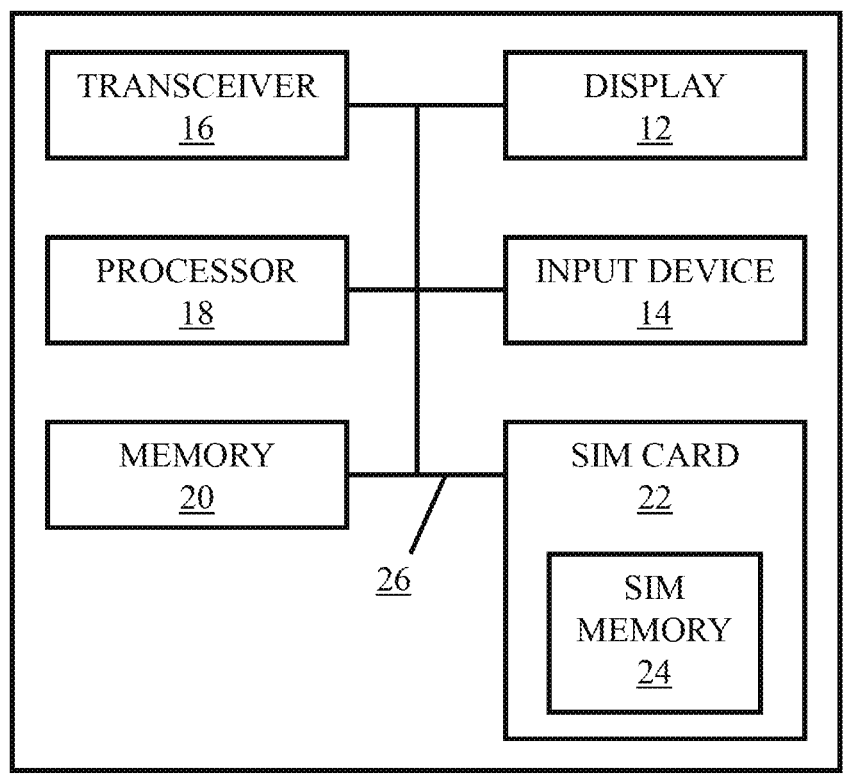
FIG. 1 illustrates a block diagram of an exemplary wireless device.

FIG. 1 illustrates a block diagram of an exemplary wireless device. The wireless device 10 can be any mobile technology computing device that connects to a wireless communication network such as, for example, a mobile phone, a wireless handset, a wireless dongle, user equipment, a mobile station, or the like. The wireless device 10 includes a display 12, an input device 14, a transceiver 16, a processor 18, a memory 20, and may include a Universal Integrated Circuit Card ("UICC") or Subscriber Identity Module ("SIM") card 22. In some implementations, the SIM card 22 can be removably received within a card slot (not shown) in the wireless device 10 and can include internal SIM memory 24. The SIM card 22 can store identification information such as an International Mobile Subscriber Identity ("IMSI"), a key used to identify and authenticate subscribers using the wireless device 10, or the like. The SIM card 22 can be configured to be transferred between different wireless devices 10. In other implementations, the wireless device 10 can operate without a UICC or SIM card 22.

The processor 18 is capable of processing instructions for execution within the wireless device 10. For example, the processor 18 can process instructions stored in the memory 20 to display graphical information on the display 12 and/or to transmit or receive data using the transceiver 16. In some implementations, the processor 18 can process application instructions to display a wireless account management application on the display 12. The processor 18 can be a single-threaded processor or a multi-threaded processor. The memory 20 can include, for example, volatile or non-volatile random access memory ("RAM") and/or read only memory ("ROM"). The components 12, 14, 16, 18, and 20 within the wireless device 10 communicate through an internal bus 26.

Figure 2:
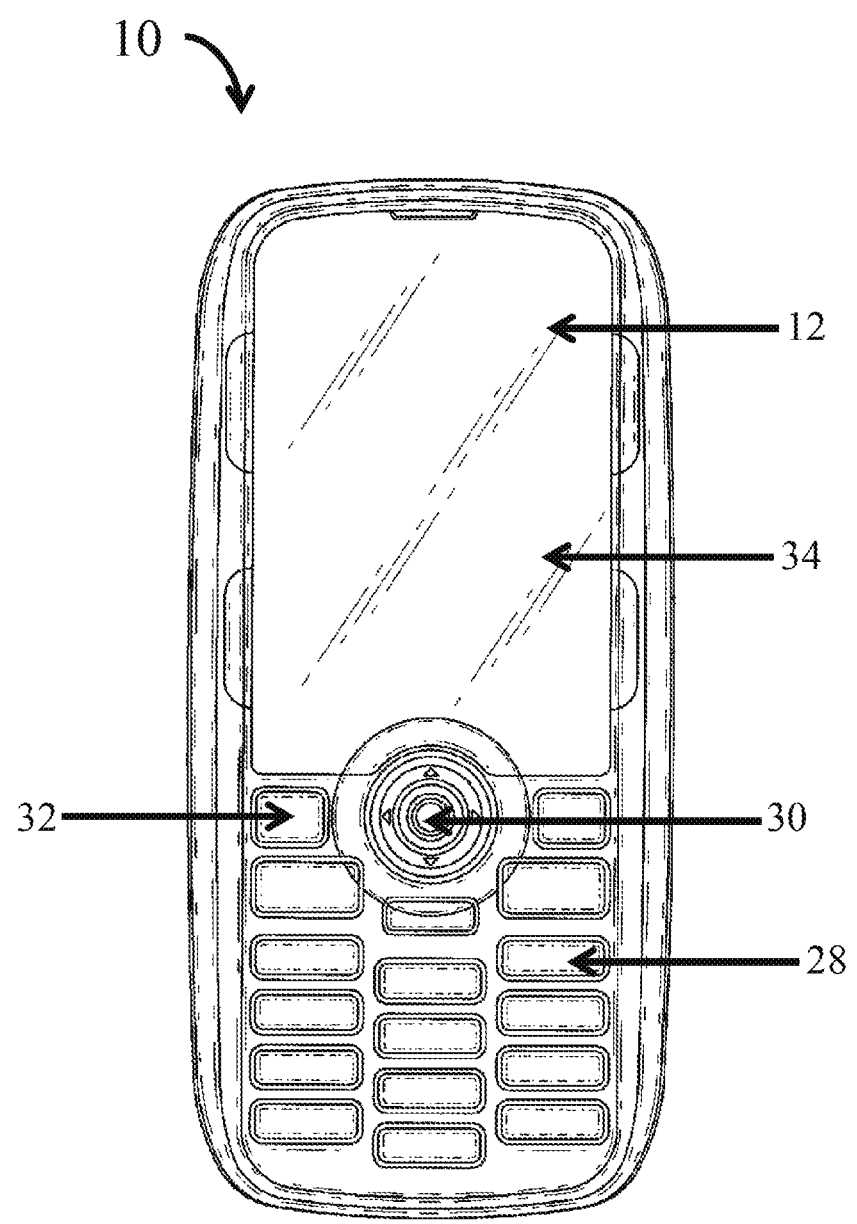
FIG. 2 illustrates an exemplary wireless device.

FIG. 2 illustrates an exemplary wireless device. The wireless device 10 may include a display 12 that is a screen that can be touch sensitive. The input device 14 can include one or more of a keypad 28, a trackball 30, selectable buttons 32, a touch screen 34 having selectable regions, or the like. The wireless device 10 may also include an antenna (not shown) coupled to the transceiver 16 to facilitate the transmission and receipt of communications by the wireless device 10.

Figure 3:
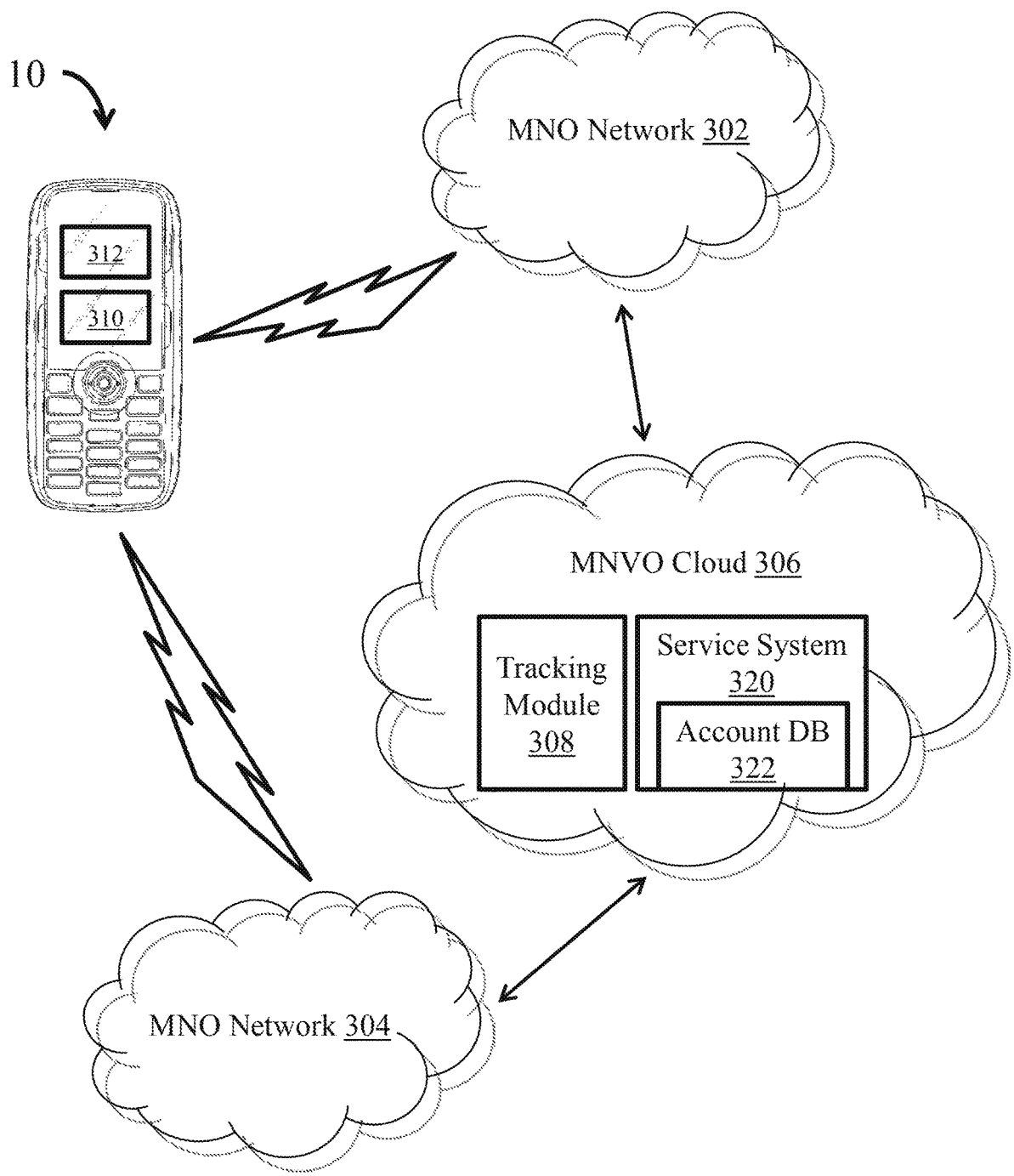
FIG. 3 illustrates a schematic diagram showing the connectivity between a wireless device, a plurality of mobile network operators, and a mobile virtual network operator.

FIG. 3 illustrates a schematic diagram showing the connectivity between a wireless device 10, a plurality of mobile network operators ("MNO") networks 302 and 304, and a mobile virtual network operator ("MVNO") cloud 306. The MVNO cloud 306 includes a tracking module 308 and a wireless subscriber service system 320 that includes an account information database 322. The wireless device 10 includes a tracking module 310 and a wireless account management application 312.

Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network, such as a cellular data network, e.g., a Global System for Mobile Communication ("GSM") network, a Code-Division Multiple Access ("CDMA") network, a Universal Mobile Telecommunications System ("UMTS") network, an Evolution-Data Optimized ("EV-DO") network, a LTE network, a wireless local network, a wide area network, or the like.

In some implementations, a wireless subscriber purchases a wireless communications plan from a MVNO. The MVNO is a wireless operator that typically does not own its own frequency spectrum or have its own network infrastructure. Instead, MVNOs contract for the right to access a wireless communications network owned by an MNO and sell that access to their wireless subscribers, Therefore, to provide activation, metering, additional services, and other customer services to their subscribers, MVNOs operate systems, such as the MVNO cloud 306, that communicate with the MNO networks 302 and 304.

The MVNO cloud 306 communicates with the MNO networks 302 and 304 to receive information about the usage of the wireless device 10 on the MNO networks 302 and 304. The MVNO cloud 306 can be one or more of dedicated hardware, application specific integrated circuits, programmable logic arrays, computers, and servers including one or more processors and one or more memories. For example, the one or more processors of the MVNO cloud 306 can be configured to perform the functions of the tracking module 308 and the wireless subscriber service system 320 and the one or more memories of the MVNO cloud 306 can be configured to store the usage information in the tracking module 308 and the account information of the wireless subscribers of the MVNO in an account information database 322.

The tracking module 308 can store the usage information for each of the subscribers of the MVNO from the start of a relationship between the wireless subscriber and the MVNO and for predefined time periods. For example, the usage information can be stored in one month increments. In some implementations, to avoid compromising the integrity of the usage information and the account information, the information stored on the tracking module 308 and the wireless subscriber service system 320 can be stored in a secure memory of the MVNO cloud 306 and/or encrypted.

The wireless subscriber service system 320 can be implemented as one or more of software or hardware. The wireless subscriber service system 320 manages the services provided by the MVNO to the wireless subscribers. In some implementations, the wireless subscriber service system 320 provides and/or enables the functions of the wireless account management application 312. The wireless subscriber service system 320 can also provide one or more of advertisements, self-care, diagnostics, alert management, policy control, payment handling, offer management, campaign management, analytics, reporting, and data ratings.

For example, the wireless subscriber service system 320 can select the advertisements to be presented to the wireless subscriber using the wireless account management application 312 based on the subscriber's account information. In particular, if the subscriber has a low number of voice minutes, i.e., lower than a predetermined number of voice minutes, remaining in his/her wireless account, the wireless subscriber service system 320 can select an advertisement for the purchase of additional voice minutes. In some implementations, if the subscriber has a low number of voice minutes, i.e., lower than a predetermined number of voice minutes, remaining in his/her wireless account, the wireless subscriber service system 320 can enable the purchase of additional minutes of voice usage and/or automatically apply reserved voice minutes to the subscriber's account. In another example, if the MVNO is running a campaign to sell SMS messaging service at a discount for the month of January, the wireless subscriber service system 320 can select an advertisement for the purchase of the discounted SMS messages. In yet another example, the wireless subscriber service system 320 can send wireless service purchase information to the wireless account management application 312 for selection by the wireless subscriber.

The account information database 322 in the wireless subscriber service system 320 stores the account information associated with each of the wireless subscribers of the MVNO. The account information can include the identification and contact details of the wireless subscribers, the details of a transaction performed at the wireless account management application 312, and the history of transactions between the wireless subscriber and the MVNO, including wireless device 10 identifiers, transaction identifiers, vendor identifiers, and billing information, as explained in greater detail with regard to FIG. 4.

To track the usage of the wireless device 10, tracking modules 308 and 310 are used. In some implementations, the tracking module 308 can be included in the MVNO cloud 306 or the tracking module 310 can be included in the wireless device 10. For example, tracking module 310 can track usage of the wireless device 10 and tracking module 308 can track usage for all wireless devices associated with the MVNO. In yet other implementations, the tracking modules 308 and 310 can be located in both the MVNO cloud 306 and the wireless device 10. For example, the tracking modules 308 and 310 can store the usage of various wireless services, such as minutes of voice calls, number of SMS messages, and/or amount of data transferred. The usage information can be sent between the tracking modules 308 and 310 through one or more of the MNO networks 302 and 304.

The tracking modules 308 and 310 can be implemented as one or more of software or hardware. The tracking modules 308 and 310 can coordinate one or more of provisioning, metering, accumulating, and consolidating wireless service usage for the wireless subscribers.

The tracking module 310 included in the wireless device 10 may be pre-installed or post-installed on the wireless device 10 and can be updated over time using Over The Air ("OTA") programming or non-OTA programming. The tracking module 310 may be stored or executed on, for example, the memory 20, the UICC/SIM memory 24, dedicated hardware, application specific integrated circuits, programmable logic arrays, and/or the processor 18 of the wireless device 10. The instructions for the tracking module 310 may be included in hardware of the wireless device 10 or in an application stored in the memory 20 and/or the SIM memory 24 of the wireless device 10 and run by the operating system of the wireless device 10. The processes, features, and/or functions of the tracking module 310 may be performed with or without human interaction or augmentation.

The tracking modules 308 and 310 can store the usage of various wireless services such as, for example, the number of voice calls, the number of free voice minutes used, the number of metered voice minutes used, the total number of voice minutes used, the number of free SMS messages sent and/or received, the number of metered SMS messages sent and/or received, the total number of SMS messages sent and/or received, the free amount of data uploaded and/or downloaded, the metered amount of data uploaded and/or downloaded, and the total amount of data uploaded and/or downloaded. Other types of wireless services are contemplated as well.

The usage statistics can be stored from the start of a relationship between the wireless subscriber and the MVNO and for predefined time periods. For example, the usage statistics can be stored in one month increments. The tracking module 310 can forward the usage information to the tracking module 308 of the MVNO cloud 306 through the MNO networks 302 and 304 at predetermined time intervals, in response to a request by the MVNO cloud 306, in response to a triggering event, or the like. For example, the usage information can be forwarded to the MVNO cloud 306 every three hours, once a day, once a week, in response to movement of the wireless device 10 from a predefined geographic area, in response to each usage of a wireless service, in response to a predefined amount of usage of one or more wireless services, in response to every startup of the wireless device 10, or the like.

The tracking modules 308 and 310 also identify the wireless device 10 and/or the particular wireless subscriber using the wireless device 10 by providing identification information of the wireless device 10 and/or the wireless subscriber. For example, the identification information can include an identification number for the wireless subscriber or an identification number for the SIM card 22 associated with the wireless subscriber, such as an Integrated Circuit Card Identification ("ICCID") Electronic Serial Number ("ESN"), International Mobile Equipment Identity ("IMEI"), International Mobile Subscriber Identity ("IMSI"), Local Area Identity ("LAI"), or the like. The identification information can be specific to allow the MVNO to identify the wireless device 10 and/or wireless subscriber.

In some implementations, to avoid compromising the integrity of the identification information and the usage information, the information stored on the tracking module 310 can be stored in a secure memory of the wireless device 10 and/or encrypted. The identification and usage information can be provided to the tracking module 308 of the MVNO cloud 306 in encrypted form and/or according to a specific network protocol.

The wireless device 10 also includes a wireless account management application 312. The wireless account management application 312 is a software application that enables management of a subscriber's account with the MVNO using the wireless device 10. For example, the subscriber can view usage of wireless services, change his/her wireless communications plan from the MVNO, purchase additional usage of wireless services from the MVNO, access other applications for download and/or purchase, purchase and/or receive information on international wireless services, receive customer service including real-time troubleshooting services, find retailers, receive information on promotions from the MVNO, receive advertisements from the MVNO, and the like, using the wireless account management application 312, as explained in greater detail with regard to FIGS. 5*a-d*.

The wireless account management application 312 included in the wireless device 10 may be pre-installed or post-installed on the wireless device 10 and can be updated over time using Over The Air ("OTA") programming or non-OTA programming. For example, the wireless subscriber using the wireless device 10 can choose to install the wireless account management application 312 on the wireless device 10 at any time. The wireless account management application 312 may be stored or executed on, for example, the memory 20, the UICC/SIM memory 24, dedicated hardware, application specific integrated circuits, programmable logic arrays, and/or the processor 18 of the wireless device 10. The wireless account management application 312 may be specific to and run by the operating system of the wireless device 10.

The wireless account management application 312 can receive usage information from the tracking module 310 included in the wireless device 10 and/or from the tracking module 308 included in MVNO cloud 306. The wireless account management application 312 can receive account information for the subscriber from the wireless subscriber service system 320 including the account information database 322 of the MVNO cloud 306. For example, the wireless account management application 312 can receive all usage information from the tracking module 310 included in the wireless device 10 and account information from the wireless subscriber service system 320 of the MVNO cloud 306. In another example, the wireless account management application 312 can receive some usage information from the tracking module 310 included in the wireless device 10, other usage information from the tracking module 308 included in MVNO cloud 306, and account information from the wireless subscriber service system 320 of the MVNO cloud 306.

Figure 4:
FIG. 4 illustrates an exemplary account information database structure.

FIG. 4 illustrates an exemplary account information database structure 400. The account information database structure 400 includes a data type field 402 and a data field 404. Although one data field 404 is illustrated in FIG. 4 corresponding to a single transaction, any number of data fields can be stored in the account information database structure 400 depending on the number of transactions made by the subscribers of the MVNO. In some implementations, the data field 404 can store information regarding a transaction by the subscriber using the wireless account management application 312. However, some or the entire data field 404 can also store information regarding a transaction by the subscriber at a physical location, by calling customer service, using a website, or the like. As such, all of the transactions by the subscriber, regardless of the means that the transactions were made, can be stored in a single database.

One or more of the entries 406-450 can be stored in the service account information database structure 400. Entries 406-412 identify the wireless device 10 used to make a transaction. Entry 406 stores the serial number of the wireless device 10 used to make the transaction, such as "XYZ123456." The serial number of the wireless device 10 can be a serial number assigned to the device by its manufacturer or can be the ICCID and/or ESN. Entry 408 stores the brand of the wireless device 10 used to make the transaction, such as "Samsung." Entry 410 stores the model of the wireless device 10 used to make the transaction, such as "Galaxy," Entry 412 stores the mobile directory number ("MDN"), i.e., the phone number, associated with the wireless device 10 used to make the transaction, such as "123-456-7890."

Entries 414-426 identify the transaction. Entry 414 stores the purchase time and date of the transaction, such as "Jan. 1, 2012 8:15 AM." Entry 416 stores an identification number for the transaction, such as "A1234." Entry 418 stores the order time and date of the transaction, such as "Jan. 1, 2012 9:55 AM." In some implementations, the transaction can be a purchase that is effective immediately and, thus, the purchase date and time and the order date and time can be the same. In other implementations, the transaction can be a purchase to be available in the future and, thus, the purchase date and time can be before the order date and time.

Entry 420 stores an identifier of the product purchased in the transaction, such as "123XYZ456." Entry 422 stores the name of the product purchased in the transaction, such as "60 Minute Package." Entry 424 stores the description of the product purchased in the transaction, such as "Voice Time of 60 Minutes." Entry 426 stores the type of the product purchased in the transaction, such as "Voice." In some implementations, the type of product entry 426 can be one of the types of wireless services, such as voice, SMS messaging, and data. However, the type of product entry 426 can be any type of product, such as, for example, a wireless device and/or an accessory for a wireless device.

Entries 428-430 identify the vendor that was used to make the transaction. Entry 428 stores the vendor name used to make the transaction, such as "Tracfone." In some implementations, the vendor can be the MVNO that sells a wireless device and/or wireless service to the subscriber. In other implementations, the vendor can be a third party that resells the MVNO's products and/or services. Entry 430 stores an identifier of the vendor used to make the transaction, such as "A1."

Entries 432-450 store billing information for the transaction. Entry 432 stores the retail price of the product purchased in the transaction, such as "$19.99." Entry 434 stores the purchase price of the product purchased in the transaction, such as "$14.99." In some implementations, the purchase price entry 434 can be the same as the retail price entry 432. In other implementations, the purchase price entry 434 can be lower than the retail price entry 432 reflecting a discount for the purchase. Entry 436 stores the payment type of the transaction, such as "credit card." Other payment types, including cash, check, and the like, can also be stored in the payment type entry 436.

Entry 438 stores the billing date and time of the transaction, such as "Jan. 1, 2012 10:00 AM." Entry 440 stores the billing city of the transaction, such as "Washington." Entry 442 stores the billing state of the transaction, such as "DC." Entry 444 stores the billing zip code of the transaction, such as "20036." The billing city entry 440, billing state entry 442, and billing zip code entry 444 can store information regarding the billing address of the wireless subscriber making the purchase.

Entry 446 stores the credit card type used to pay for the transaction, such as "XYZ Card." Entry 448 stores an identifier for the credit card request used to pay for the transaction, such as "1234-5678-9012-3456." Entry 450 stores an identifier for the merchant processing the payment of the transaction, such as "ProcessingCenter." Although example data for the entries 406-450 are illustrated in FIG. 4, any alphanumeric data can be stored in the entries 406-450 depending on the transaction.

FIGS. 5a-5d illustrate exemplary graphical user interfaces ("GUIs") of the wireless account management application 312. The wireless account management application 312 can also include other GUIs that are not illustrated. The user, i.e., the wireless subscriber, of the wireless device 10 can select to run the wireless account management application 312 by selecting an icon associated with the wireless account management application 312. For example, the wireless subscriber can touch the icon associated with the wireless account management application 312 on a homepage displayed on the display 12 of the wireless device 10.

In some implementations, before allowing the subscriber to access his/her account information, the wireless account management application 312 can require that the subscriber enter authentication credentials. For example, the subscriber can be required to enter a username and password combination, a personal identification number ("PIN"), biometric information, and the like. In a particular example, the wireless account management application 312 can automatically recall the username of the subscriber and, thus, the subscriber can only be required to enter a password. In some implementations, the subscriber can be required to enter the authentication credentials only the first time he/she accesses the wireless account management application 312. The authentication credentials may then be saved for the subscriber to enable the subscriber to view the welcome page GUI 500 of the wireless account management application 312 after selecting the icon associated with the wireless account management application 312 without entering any authentication credentials.

Moreover, although objects 502-568 are illustrated in the GUIs 500-560 of FIGS. 5a-5d, one or more of the objects 502-568 can be removed from the GUIs and/or one or more objects that are not illustrated can be added to the GUIs. For example, the welcome page GUI 500 may not illustrate an advertisement 526. In addition, although objects 502-568 are illustrated according to a particular layout in the GUIs 500-560, the layout of the objects 502-568 can be changed to any other layout. For example, the banner 502 can be moved to directly above the advertisement 526 at the bottom of the welcome page GUI 500. Finally, although the objects 502-568 are shown having various shapes and sizes, the size and/or shape of one or more of the objects 502-568 can be changed. For example, the MVNO logo 504 can be made to encompass the entire welcome page GUI 500 as a watermark image in the background of the GUI.

Figure 5A:
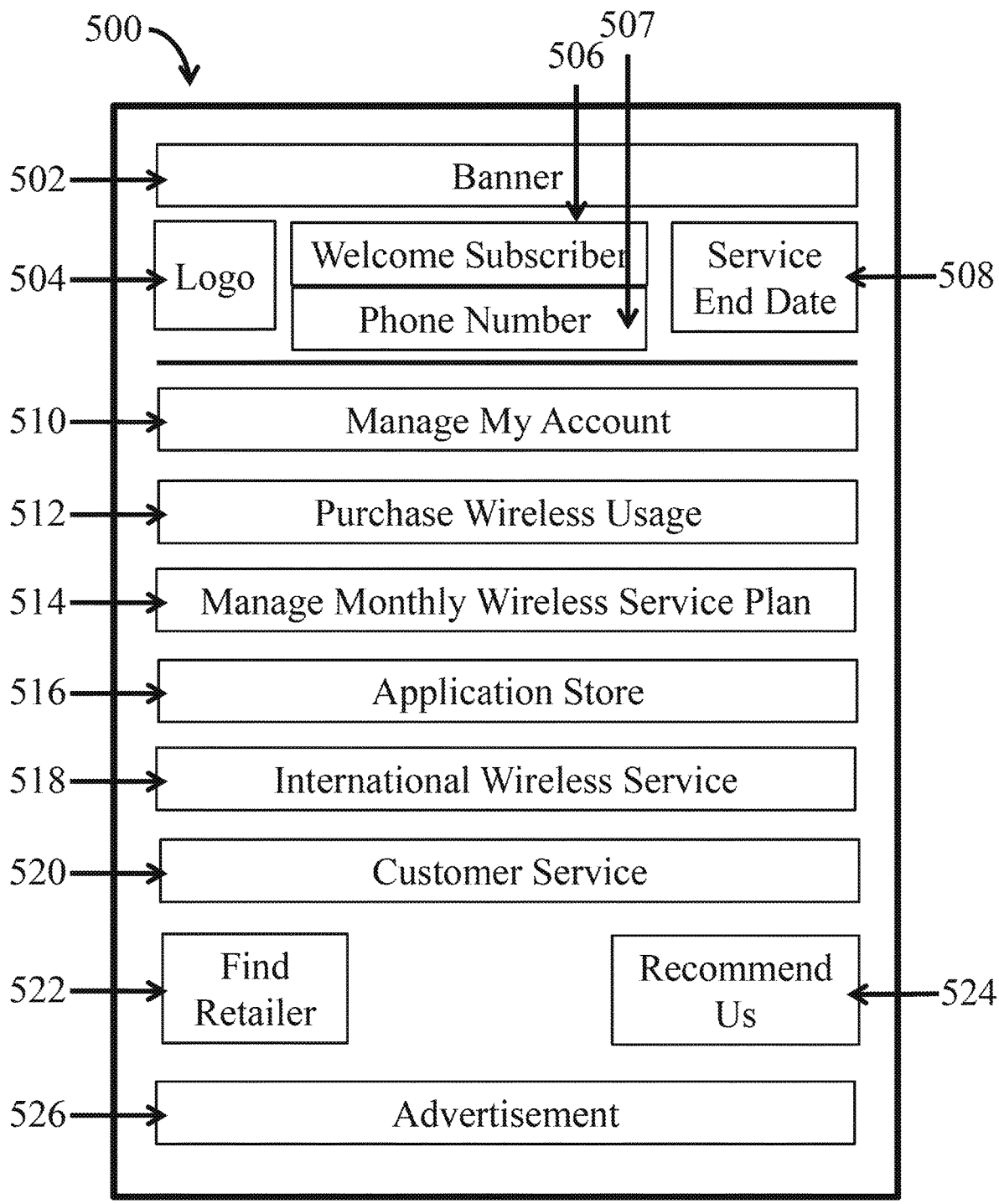
FIGS. 5*a*, 5*b*, 5*c*, and 5*d* illustrate exemplary graphical user interfaces of a wireless account management application.

Referring to FIG. 5a, the welcome page GUI 500 is illustrated. The banner 502, MVNO logo 504, wireless subscriber greeting 506, phone number associated with the wireless device 507, and service end date 508 can be displayed at the top of the welcome page GUI 500. In some implementations, the objects 502-508 can be displayed in every GUI of the wireless account management application 312. For example, the objects 502-508 can be displayed at the top of every GUI of the wireless account management application 312, as illustrated in FIGS. 5a-5d.

The wireless account management application 312 can retrieve some or all of the information to display the objects 502-508 from the wireless subscriber service system 320 of the MVNO cloud 306. For example, the wireless account management application 312 can retrieve the banner 502 and the service end date 508 from the wireless subscriber service system 320, while retrieving the MVNO logo 504, wireless subscriber greeting 506, and phone number 507 from a memory on the wireless device 10.

The banner 502 displays MVNO company information, such as, for example, company history, company milestones, marketing campaigns, and product information. For example, if the MVNO has decided to offer a discount on wireless products and/or services for a particular time period, information regarding this promotion can be displayed in the banner 502 during that particular time period. In another example, the MVNO can display a company milestone, such as signing up its hundred millionth subscriber in the banner 502. As such, the banner 502 can change every time the subscriber accesses the wireless account management application 312, at predetermined time periods according to the promotions of the MVNO, after a predetermined number of impressions, or the like. The banner 502 can include any combination of images and/or text.

The MVNO logo 504 is an image or text object of the logo of the MVNO. The wireless subscriber greeting 506 displays a salutation and the name of the wireless subscriber. For example, the wireless subscriber greeting 506 can display "Hi Bob," "Welcome Bob," or the like. In some implementations, the wireless subscriber greeting 506 can change depending on date and time. For example, before noon, the wireless subscriber greeting 506 can display "Good morning Bob" and after noon, the wireless subscriber greeting 506 can display "Good afternoon Bob." The phone number 507 is the phone number for the wireless subscriber that is associated with the wireless device 10. In some implementations, if the wireless subscriber uses the wireless device 10 in different geographical boundaries, such as different countries, the phone number 507 displayed can change depending on the geographical location.

The service end date 508 displays the final date that the subscriber has wireless service access with the MVNO according to his/her current wireless service contract. If the subscriber purchases another wireless service contract or extends his/her current wireless service contract, the service end date 508 may change to a later date. In some implementations, if a low number, i.e., less than a predetermined number, of days remain on the current wireless contract of the subscriber, an alert can be forwarded to subscriber from the MVNO. For example, a call from a customer service representative can be placed to the wireless device 10, an SMS message can be sent to the wireless device 10, an alert can be displayed the next time the subscriber runs the wireless account management application 312, and the like.

The find retailer button 522 is selectable by the subscriber and enables the subscriber to find retailers that are associated with the MVNO. For example, after selecting the find retailer button 522, the subscriber may view a GUI including a map identifying the physical locations, i.e., stores, that sell the MVNO's wireless products and services close to, i.e., within a predetermined distance of, the physical location of the wireless device. In another example, after selecting the find retailer button 522, the subscriber can be linked to a webpage including a listing of physical locations that sell the MVNO's wireless products and services close to the physical location of the wireless device. In some implementations, directions to one or more of the physical locations can be provided to the subscriber based on the physical location of the wireless device 10 and the address of a store of interest to the subscriber.

The recommend us button 524 is selectable by the subscriber and enables the subscriber to recommend the MVNO's product and services. For example, after selecting the recommend us button 524, a prefilled SMS message or prefilled email can be presented to the subscriber to forward to one or more contacts. In another example, after selecting the recommend us button 524, the subscriber can be linked to the webpage of the MVNO or a social media webpage associated with the MVNO. The subscriber can then signify or "like" the webpage. In yet another example, after selecting the recommend us button 524, the subscriber may automatically signify or "like" a webpage associated with the MVNO.

The advertisement 526 displays an advertisement for the MVNO or a third party. The advertisement 526 can be displayed on none, some, or all of the GUIs of the wireless account management application 312. The wireless account management application 312 retrieves the advertisement from the wireless subscriber service system 320 or from a third party advertisement system. The advertisement 526 can be selectable, such that selection of the advertisement directs the subscriber to, for example, a particular webpage, a particular phone number, or the like. The advertisement 526 can include any combination of images and/or text.

In some implementations, the advertisement 526 displays an advertisement that is selected for a particular subscriber. The advertisement 526 can be selected based on the account information of the subscriber stored in the wireless subscriber service system 320 and/or other information stored on the wireless device 10. For example, the advertisement 526 can be selected based on the browser history, the other stored mobile applications, and other subscriber specific information on the wireless device 10.

The buttons 510-520 enable a wireless subscriber to access various GUIs of the wireless account management application 312. The buttons 510-520 may be static or may be dynamic and retrieved from the wireless subscriber service system 320. The account management button 510 allows the wireless subscriber to view and/or change account information. The subscriber can select the account management button 510 to access the account management GUI 530 of FIG. 5b by, for example, touching the account management button 510. The subscriber may be required to enter account information, such as a name, identification number, shipping address, billing address, form of payment, or the like, the first time the subscriber uses the wireless account management application 312. The subscriber can then change any of his/her account information in the account management GUI 530. In some implementations, the subscriber can also view wireless service usage in real-time or for predetermined time periods by selecting the account management button 510, as explained in greater detail with regard to the account management GUI 530.

The usage purchase button 512 allows the wireless subscriber to purchase predetermined units of usage for one or more wireless services. For example, the subscriber can purchase 60 minutes of voice usage or 250 SMS messages. In another example, the subscriber can purchase a bundle of 60 minutes of voice usage, 250 SMS messages, and 2 GB of data usage. The subscriber can select the usage purchase button 512 to access the usage purchase GUI 550 of FIG. 5c by, for example, touching the usage purchase button 512. For security reasons, the subscriber may be required to enter authentication credentials every time the subscriber purchases wireless usage using the wireless account management application 312.

The monthly wireless service plan button 514 allows the subscriber to purchase a monthly wireless service plan that includes a predetermined number of units of one or more wireless services each month. The information regarding the current monthly service plans available to the subscriber by the MVNO can be retrieved from the wireless subscriber service system 320. In addition, the subscriber can cancel a monthly wireless service plan or switch from one monthly wireless service plan to another. For example, the subscriber may wish to increase or decrease his/her monthly wireless service usage. For security reasons, the subscriber may be required to enter authentication credentials every time the subscriber purchases or changes his/her monthly wireless service plan using the wireless account management application 312.

Following selection of the monthly wireless service plan button 514, a monthly wireless service plan GUI can be illustrated to the subscriber. For example, the monthly wireless service plan GUI can include individual selectable buttons for each monthly wireless service plan available to the subscriber. Other information, such as the number of units of wireless services credited every month, the number of months of service, whether unused units of wireless service roll over, the prices of the monthly wireless service plans, and the like, can also be displayed. Different monthly wireless service plans can provide different levels of usage of wireless services at different prices. For example, one monthly wireless service plan can provide 300 minutes of voice usage over a three month period, while another monthly wireless service plan can provide 100 minutes of voice usage, 250 SMS messages, and 1 GB of data usage over a one month period.

Selection of a particular monthly wireless service plan may direct the subscriber to a payment GUI for payment of the cost of the monthly wireless service plan. The payment GUI can enable the subscriber to pay with a stored credit card, enter a new credit card, pay with a prepaid card on reserve as explained in greater detail with reference to button 552, and/or enroll in automatic monthly payments for the monthly wireless service plan. Following payment of the cost of the monthly wireless service plan, the data for the transaction may be sent to the wireless subscriber service system 320 for creating a new data field in the account information database 322. In addition, a transaction summary GUI informing the subscriber that the transaction was successful may be displayed.

The application store button 516 allows the subscriber to purchase and/or download applications for the wireless device 10. The application can be specific to the operating system of the wireless device 10. The applications available to the subscriber can be retrieved from the wireless subscriber service system 320 or from a third party application system. The applications can include applications from the MVNO and/or a third party. Following download, the applications can be stored in the memory 20 of the wireless device and processed by the processor 18 of the wireless device.

The international wireless service button 518 allows the subscriber to purchase or receive information regarding usage of international wireless service. For example, following selection of the international wireless service button 518, an international wireless service GUI can be displayed to the subscriber. The international wireless service GUI can include individual selectable buttons for each international wireless service option available to the subscriber. For example, the subscriber can purchase particular units of one or more international wireless services over a predetermined time period for a predetermined price. In another example, direct inward dialing ("DID") numbers can be displayed to the subscriber in the international wireless service GUI. In some implementations, the information displayed in the international wireless service GUI can be retrieved from the wireless subscriber service system 320. Selection of a particular international wireless service option may direct the subscriber to the payment GUI for payment of the cost of the monthly wireless service plan.

The customer service button 520 allows the subscriber to access customer service of the MVNO. Following selection of the customer service button 520, a customer service GUI 560 is displayed to the subscriber, as explained in greater detail with regard to FIG. 5d.

Figure 5B:
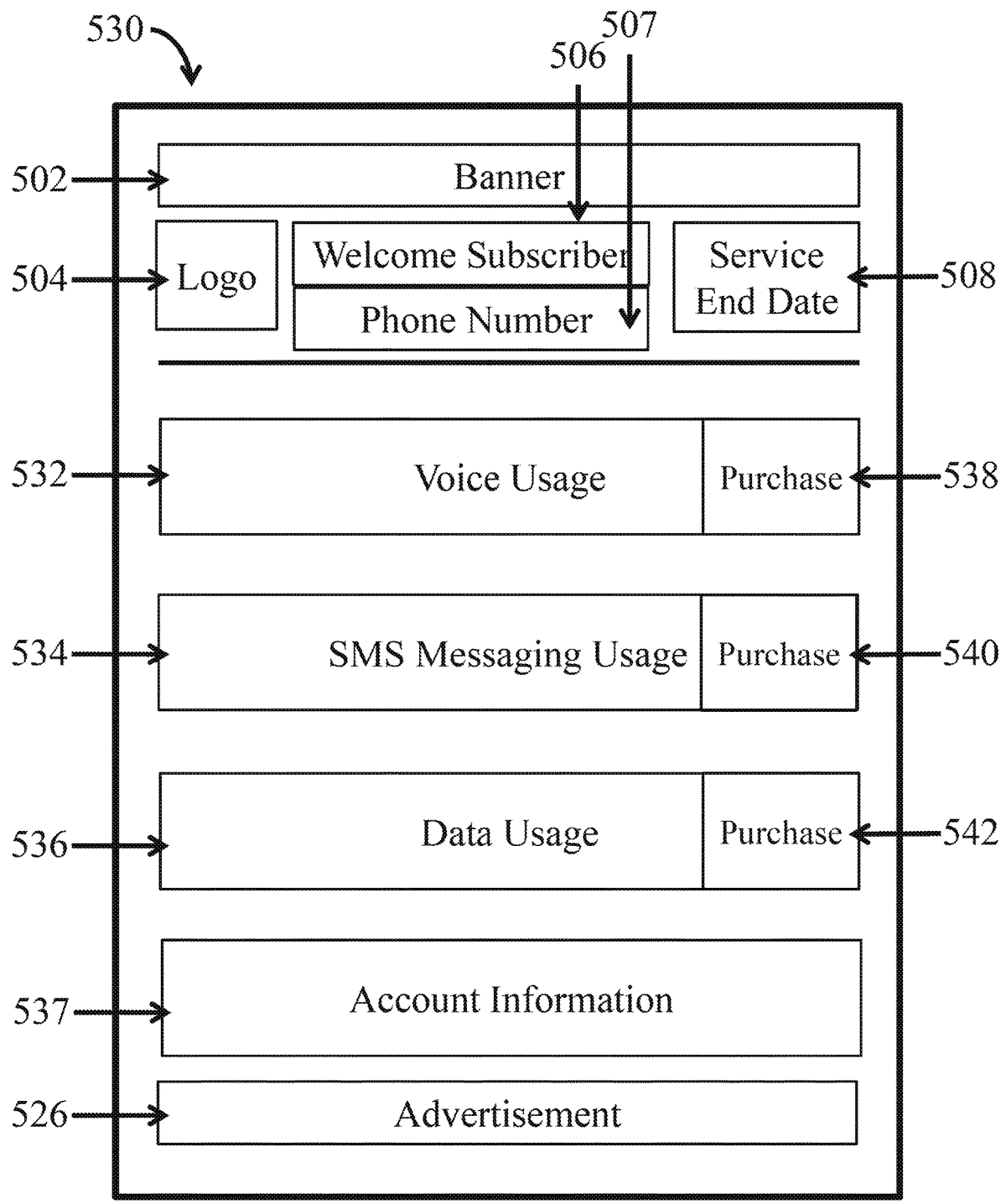

Referring to FIG. 5b, following selection of the account management button 510, the account management GUI 530 may be displayed. The account management GUI 530 can display usage of wireless services for the subscriber, such as voice usage 532, SMS messaging usage 534, and data usage 536. The usage of the wireless services can be current to the moment the subscriber selects the account management button 510, i.e., real-time. Alternatively, the usage of the wireless services can be for prior predetermined time periods, such as prior months and/or billing cycles. The other account information for the subscriber can be displayed in response to selection of the account information button 537. The subscriber can view and/or update his/her account information on an account information GUI.

In some implementations, the account management GUI 530 can display usage of wireless services remaining for the subscriber's wireless service account. For example, the number of voice minutes remaining, the number of SMS messages remaining, and the amount of data transfer remaining can be displayed. In some implementations, the usage and/or remaining usage of wireless services for the subscriber can be retrieved by the wireless account management application 312 from the tracking module 310 of the wireless device 10. In other implementations, the usage of wireless services for the subscriber can be retrieved by the wireless account management application 312 from the tracking module 310 of the wireless device 10 while the remaining usage of wireless services for the subscriber can be retrieved from the wireless subscriber service system 320. In yet other implementations, both the usage and remaining usage of wireless services for the subscriber can be retrieved by the wireless account management application 312 from the wireless subscriber service system 320.

In some implementations, the option to purchase additional usage of individual wireless services can also be displayed on the account management GUI 530. Button 538 is selectable to enable the purchase of additional voice minutes, button 540 is selectable to enable the purchase of additional SMS messages, and button 542 is selectable to enable the purchase of additional data usage. Selection of one of the buttons 538-542 by the subscriber can result in display of a purchasing GUI for that particular wireless service. For example, if the subscriber selects button 532, a voice service purchasing GUI can be displayed that includes individual selectable buttons for different units of voice service. Similarly, selection of button 534 triggers display of an SMS message purchasing GUI and selection of button 536 triggers display of a data purchasing GUI.

While in some implementations, buttons 538-542 can always be displayed on the account management GUI 530, in other implementations, buttons 538-542 can only be displayed if the subscriber has a low number, i.e., below a predetermined number, of units for that wireless service remaining in his/her account. For example, if the subscriber has less than one hundred voice minutes remaining in his/her account, button 538 can be displayed to enable the subscriber to purchase additional minutes. However, in such an example, buttons 540 and 542 may not be displayed because the subscriber has more than the predetermined units of usage of SMS messages and data transfer remaining in his/her account. The predetermined number of units remaining that triggers display of buttons 538-542 can differ for each of the different wireless services.

Figure 5C:
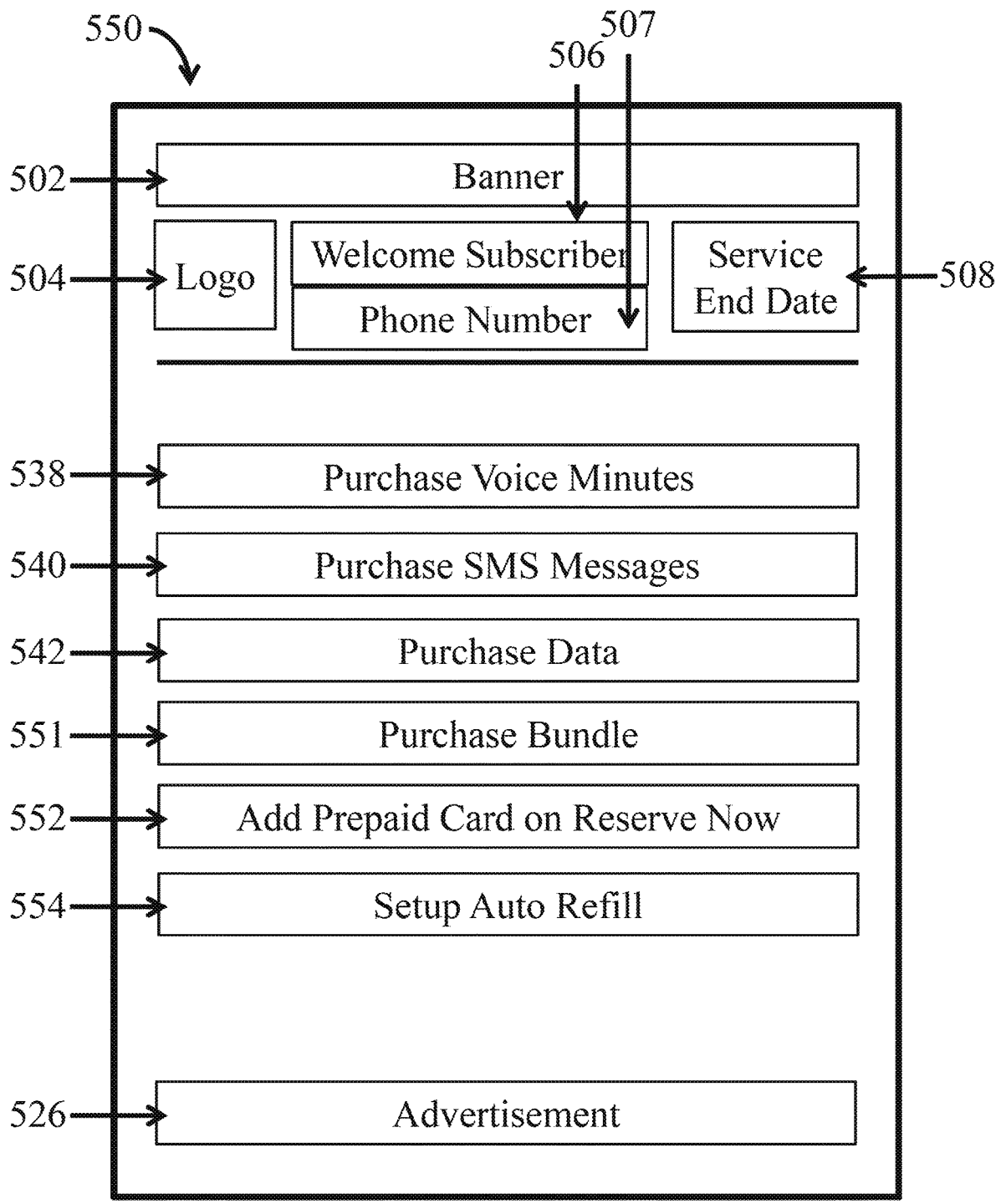

Referring to FIG. 5c, following selection of the usage purchase button 512, the usage purchase GUI 550 is displayed. The usage purchase GUI 550 includes the buttons 538-542 for the purchase of units of voice service, SMS messaging server, and data service. In addition, button 551 is selectable to enable purchase of a bundle of units of wireless services, For example, if the subscriber selects button 551, a wireless service bundle purchasing GUI can be displayed that includes individual selectable buttons for different bundles of units of wireless services.

Button 552 is selectable to add the units of wireless service or a monetary amount from a prepaid card to the subscriber's account. Following selection of the button 552, a prepaid card reserve GUI is displayed to the subscriber. The subscriber can enter an identifier, such as a serial number of the prepaid card in the prepaid card reserve GUI. The identifier of the prepaid card is then sent from the wireless device 10 to the wireless subscriber service system 320. The wireless subscriber service system 320 determines either a number of units of wireless service or a monetary value associated with the prepaid card. In some implementations, that number of units of the wireless service or monetary value is immediately added to the subscriber's wireless service account. In other implementations, that number of units of the wireless service or monetary value is reserved and not added to the subscriber's wireless service account, so that the subscriber can add the units of the wireless service or monetary value at a later time.

Button 554 is selectable to setup automatic refill of the units of wireless service or a monetary amount to the subscriber's account. Following selection of the button 554, an automatic refill GUI is displayed to the subscriber. The subscriber can select for the MVNO to automatically, i.e., without user augmentation or interaction, purchase additional usage or deposit additional money into the subscriber's account following a trigger event. The trigger event can be that the remaining usage of one or more wireless services or monetary value in the subscriber's account is below a predetermined threshold. The trigger event can be the start of a predetermined time period, such as the beginning of the next month and/or new billing cycle, The trigger can be a predetermined time before the end service date of the wireless service contract. Payment for the automatic purchase or deposit of money can be from a stored credit card in the subscriber's account, withdrawal from a stored bank account in the subscriber's account, a prepaid card on reserve in the subscriber's account, and the like.

Figure 5D:
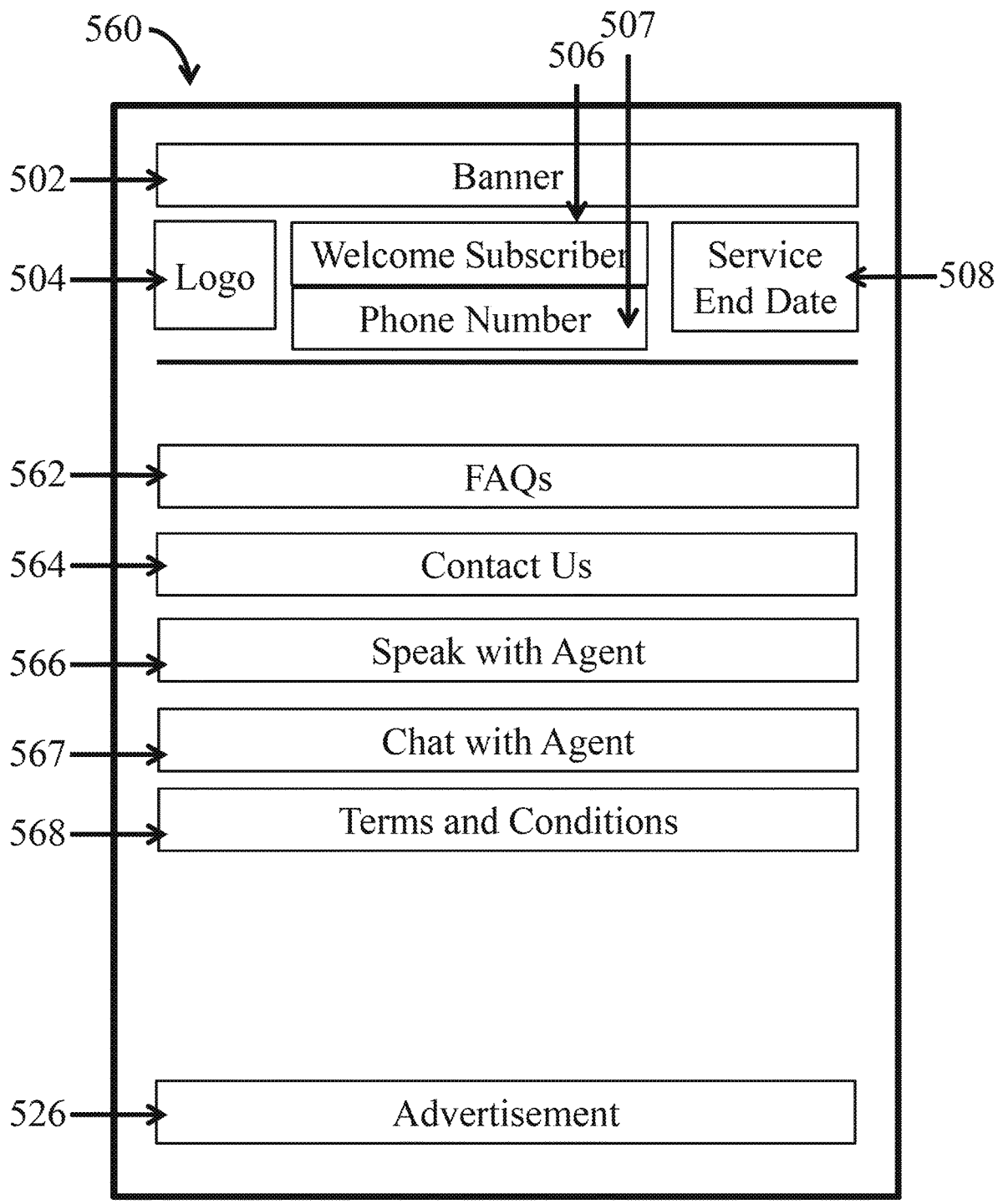

Referring to FIG. 5d, following selection of the customer service button 520, the customer service GUI 560 is displayed. The customer service GUI 560 includes button 562 that is selectable to display frequently asked questions ("FAQs") and button 564 that is selectable to display contact information for the MVNO such as, for example, a web address, a physical address, an email address, one or more phone numbers, and the like. Button 566 is selectable to enable the wireless device 10 to call a customer service phone number for the MVNO without the need for the subscriber to enter the customer service phone number. Button 567 is selectable to enable the subscriber to chat in real-time with customer service representative of the MVNO. In some implementations, if a customer service representative is not available to chat, the color of the button 567 can be change and/or the button 567 can be made unselectable. Button 568 is selectable to display the terms and conditions of the MVNO. The information displayed to the subscriber in response to selection of any one of the buttons 562-568 can be retrieved from the wireless subscriber service system 320.

Figure 6:
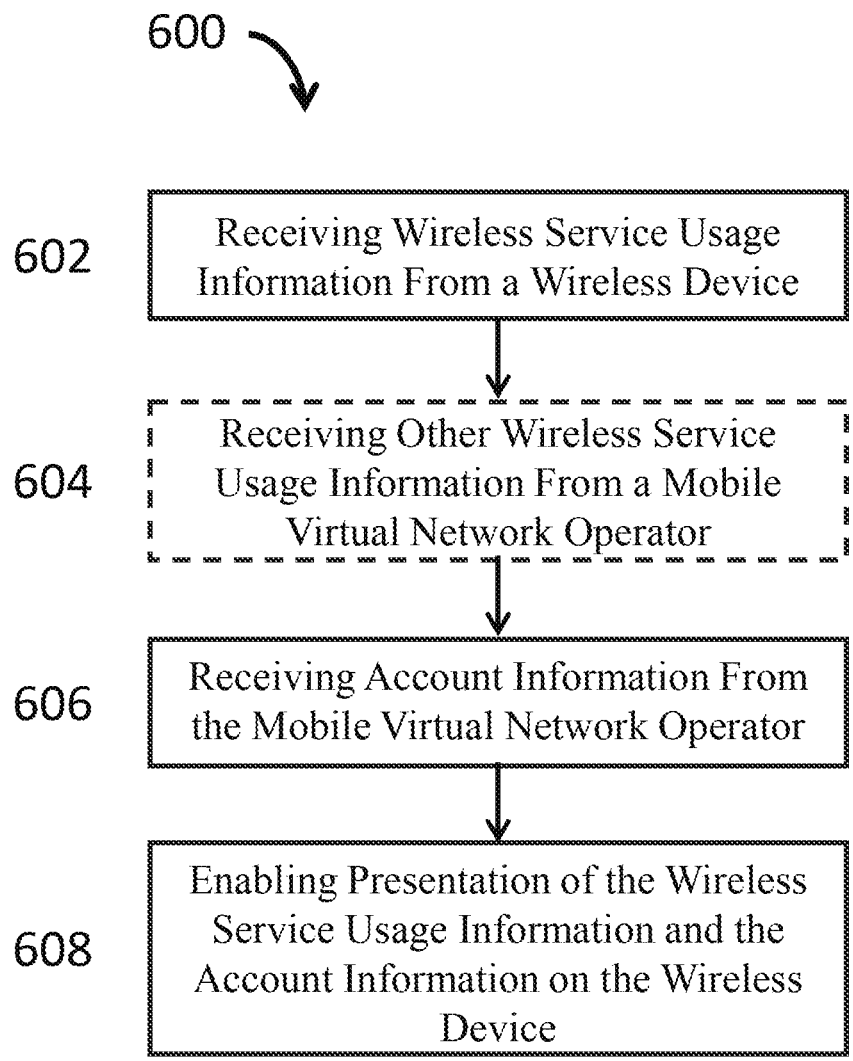
FIG. 6 illustrates a flowchart showing an exemplary process for displaying wireless service usage information and account information on a wireless device.

FIG. 6 illustrates a flowchart showing an exemplary process for displaying wireless service usage information and account information on a wireless device. One or more steps in the process 600 can be carried out by, for example, an electronic system such as the wireless device 10, the wireless subscriber service system 320 of the MVNO cloud 306, and a third party system. Following selection of the icon associated with the wireless account management application 312, the wireless account management application 312 can send an identifier of the wireless subscriber and/or wireless device 10 to the tracking modules 308 and 310 as well as the wireless subscriber service system 320 to receive the wireless service usage information and the account information.

Initially, wireless service usage information is received from the wireless device 10 (step 602). The wireless account management application 312 receives the wireless service usage information from the tracking module 310 of the wireless device 10. In some implementations, the wireless service usage information can be received following selection of the icon associated with the wireless account management application 312 while in other implementations, the wireless service usage information can be received following selection of the account management button 510.

The wireless service usage information includes one or more of the number of voice calls, the number of free voice minutes used, the number of metered voice minutes used, the total number of voice minutes used, the number of free SMS messages sent and/or received, the number of metered SMS messages sent and/or received, the total number of SMS messages sent and/or received, the free amount of data uploaded and/or downloaded, the metered amount of data uploaded and/or downloaded, and the total amount of data uploaded and/or downloaded. The received wireless service usage information can be usage from the start of a relationship between a wireless subscriber and the MVNO or for predefined time periods. For example, the wireless service usage information can be received for the current billing cycle.

In some implementations, other wireless service usage information can optionally be received from the MVNO cloud 306 (step 604). In particular, the wireless account management application 312 can receive the other wireless service usage information from the tracking module 308 of the MVNO cloud 306. In some implementations, the other wireless service usage information can be received from the tracking module 308 at the same time that the wireless service usage information is received from the tracking module 310 while in other implementations, the other wireless service usage information can be received from the tracking module 308 following reception of the wireless service usage information from the tracking module 310.

In some implementations, the other wireless service usage information can be wireless service usage information that is not stored on the tracking module 310 of the wireless device 10. For example, the tracking module 310 may store wireless service usage information for a current billing cycle and the subscriber may request to view cumulative wireless service usage information for the duration of the relationship between the subscriber and the MVNO. The wireless account management application 312 may then receive wireless service usage information for the current billing cycle from the tracking module 310 and other wireless service usage information for previous billing cycles from the tracking module 308 and sum the usages together.

In another example, the tracking module 310 may store only voice usage information and the subscriber may request to view usage of voice, SMS messaging, and data services. The wireless account management application 312 may then receive voice usage information from the tracking module 310 and SMS messaging and data usage from the tracking module 308.

In yet another example, the wireless account management application 312 may include a usage checking feature that confirms the wireless service usage. In particular, wireless account management application 312 receives wireless service usage information from the tracking module 310 for a particular time period and the other wireless service usage information from the tracking module 308 for the same time period and compares the usages of the wireless services. Only if the usages are consistent may the wireless account management application 312 enable display of the wireless service usage information.

Account information is also received from the MVNO cloud 306 (step 606). In particular, information regarding the management of the wireless subscriber's account and/or wireless service purchase information is received by the wireless account management application 312 from the wireless subscriber service system 320. The account information can include any information necessary to perform the functions of the wireless account management application 312 and/or displayed to the subscriber in the wireless account management application 312.

In some implementations, for example, the account information can include one or more of the banner 502, subscriber name displayed in the wireless subscriber greeting 506, and the service end date 508 displayed in the welcome page GUI 500. The account information can include the account information displayed to the subscriber in response to selection of the account information button 537. such as the information stored in the service account information database structure 400. The account information can include one or more of the options to purchase additional usage of individual wireless services available to the subscriber by the selection of buttons 538-542. The account information can also include one or more of the bundles of units of wireless available to the subscriber, the addition of a prepaid card to the subscriber's account, information regarding any prepaid cards that are already reserved in the subscriber's account, and the indication of whether the subscriber's account includes automatic refill. In addition, the account information can also include customer service information that is displayed in the customer service GUI 560, such as one or more of FAQs, contact information for the MVNO, customer service phone numbers, IP address for chatting with a customer service representative of the MVNO.

The wireless account management application 312 then enables presentation of the wireless service usage information and the account information on the wireless device (step 608). In particular, the wireless account management application 312 configures one or more GUIs, such as GUIs 500-560 for display on the display 12 of the wireless device 10.

For example, to configure the account management GUI 530, the wireless account management application 312 receives the wireless service usage information from the tracking module 310 for display in objects 532-536 and receives the account information from the wireless subscriber service system 320 for configuring objects 537-542. The configured account management GUI 530 is then sent to the display 12.

It s to be understood the implementations are not limited to particular systems or processes described which may, of course, vary. It is also to be understood that the terminology used herein is for the purpose of describing particular implementations only, and is not intended to be limiting. As used in this specification, the singular forms "a," "an," and "the" include plural referents unless the content clearly indicates otherwise. Thus, for example, reference to "a wireless device 10" includes two or more wireless devices.

Reference to "one implementation," "some implementations," "other implementations," or "one or more implementations" means that a particular feature, structure, or characteristic described in connection with the implementation is included in at least one implementation but not necessarily in the same implementation or separate implementations that are mutually exclusive. Moreover, various features may be exhibited by some implementations and not by other implementations. Similarly, various requirements are described that may be requirements for some implementations but not other implementations.

A number of implementations have been described. Nevertheless, it will be understood that various modifications may be made without departing from the spirit and scope of the claims. For example, the wireless device 10 may not utilize a UICC or SIM card 22. The wireless device 10 may operate using any mobile operating system. The internally stored rules of operation of the wireless device 10 may be changed together with other wireless devices via a broadcast message received from the MVNO.

Although for the sake of clarity and simplicity, exemplary implementations of the invention is described in terms of a wireless device 10 used in a MVNO communications system, it should be understood that the invention is not limited to these exemplary implementations. Accordingly, other implementations are within the scope of this application.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention, Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for displaying wireless service usage information and account information using an account management application operating on a wireless device, the method comprising:

implementing the account management application with the wireless device and receiving from a tracking module implemented by a wireless service provider, wireless service usage information for a wireless subscriber associated with the wireless device, the wireless service usage information including a number of units of wireless services that the wireless subscriber has used;

comparing the wireless service usage information from the tracking module with wireless service usage information for the wireless device from a tracking module implemented by the wireless device to confirm consistency;

receiving, at the account management application operating on the wireless device and from the wireless service provider over a wireless network, account information associated with the wireless subscriber associated with the wireless device that is stored in an account information database implemented by the wireless service provider;

receiving, at the account management application operating on the wireless device, an indication that the wireless subscriber has selected to view the wireless service usage information and the account information for the wireless subscriber associated with the wireless device;

enabling presentation, on a display of the wireless device, of the account management application including the wireless service usage information and the account information for the wireless subscriber associated with the wireless device;

receiving, at the account management application operating on the wireless device and from the wireless subscriber associated with the wireless device, a request to obtain additional wireless services through a graphical user interface that includes a number of units of wireless service or a monetary value associated;

forwarding, from the account management application operating on the wireless device and to a service provider over the wireless network, the request to obtain additional wireless services that includes the number of units of wireless service or the monetary value associated; and depositing, at the service provider, the number of units of wireless service or the monetary value associated with the request to obtain additional wireless services, in an account associated with the wireless subscriber, wherein the wireless service provider being different from a wireless network operator that operates the wireless network;

wherein the wireless device comprises a smartphone; and wherein the wireless services comprise voice service, Short Message Service messaging service, and data service.

2. The method of claim 1 further comprising coordinating by the tracking module implemented by the wireless service provider and the tracking module implemented by the wireless device at least one of the following: provisioning, metering, accumulating, and consolidating wireless service usage, wherein receiving the indication that the wireless subscriber would like to view the wireless service usage information for the wireless subscriber comprises receiving the indication that the wireless subscriber has selected a button in the account management application.

3. The method of claim 1, further comprising:
generating, at the account management application operating on the wireless device, a payment graphical user interface for payment of a cost of the wireless service; and
generating, at the account management application operating on the wireless device, a social media graphical user interface to provide a recommendation for the wireless service provider.

4. The method of claim 1, further comprising:
receiving, at the account management application operating on the wireless device, advertisement information selected for the wireless subscriber according to the account information associated with the wireless subscriber; and
generating, at the account management application operating on the wireless device, a customer service graphical user interface to provide customer service information and customer service interaction.

5. The method of claim 1 further comprising:
generating, at the account management application operating on the wireless device, an automatic refill set up graphical user interface to implement automatic purchasing of additional wireless service following a trigger event,
wherein the enabling presentation of the account management application including the wireless service usage information and the account information for the wireless subscriber associated with the wireless device comprises the enabling presentation of the account management application including the wireless service usage information, the other wireless service usage information, and the account information for the wireless subscriber associated with the wireless device.

6. The method of claim 1, further comprising:
receiving, at the account management application operating on the wireless device, a request to find a wireless service retailer; and
displaying a listing of physical locations of wireless service retailers on the wireless device.

7. The method of claim 1, wherein:
the wireless service usage information includes a number of units of wireless services that the wireless subscriber has used over a first time period, and
the other wireless service usage information includes a number of units of wireless services that the wireless subscriber has used over a second time period that is before the first time period.

8. The method of claim 1, wherein:
the wireless service usage information includes a number of units of a first type of wireless service that the wireless subscriber has used, and
the other wireless service usage information includes a number of units of a second type of wireless service that the wireless subscriber has used, the second type of wireless service being different from the first type of wireless service.

9. The method of claim 1, wherein the request to obtain additional wireless services that includes the number of units of wireless service comprise a request to purchase particular amounts of voice minutes, Short Message Service messages, and data.

10. The method of claim 9, wherein the enabling presentation of the account management application including the wireless service usage information and the account information for the wireless subscriber associated with the wireless device comprises:
determining that the wireless service usage information is below a predetermined threshold; and
enabling presentation, in response to the determination that the wireless service usage information is below the predetermined threshold, of options to purchase additional usage of wireless services available to the wireless subscriber.

11. The method of claim 1, wherein the account information associated with the wireless subscriber associated with the wireless device comprises a service end date for the wireless subscriber.

12. The method of claim 1, wherein the account information comprises an identifier of the wireless device, an identifier of a transaction, an identifier of a vendor, and billing information.

13. A wireless device comprising at least one processor connected to at least one memory, wherein the at least one processor is configured to:
implement an account management application on the wireless device to receive from a tracking module implemented by a wireless service provider, wireless service usage information for a wireless subscriber associated with the wireless device, the wireless service usage information including a number of units of wireless services that the wireless subscriber has used;
compare, at the account management application operating on the wireless device, the wireless service usage information from the tracking module with wireless service usage information for the wireless device from a tracking module implemented by the wireless device to confirm consistency;
receive, at the account management application operating on the wireless device and from the wireless service provider over a wireless network, account information associated with the wireless subscriber associated with the wireless device that is stored in an account information database implemented by the wireless service provider;
enable presentation, on a display of the wireless device, of the account management application including the wireless service usage information and account information for the wireless subscriber associated with the wireless device;
receive, at the account management application operating on the wireless device and from the wireless subscriber associated with the wireless device, a request to obtain additional wireless services through a graphical user interface that includes a number of units of wireless service or a monetary value of wireless service; and
forward, from the account management application operating on the wireless device and to the wireless service provider over the wireless network, the request to obtain additional wireless services that includes the number of units of wireless service or the monetary value of wireless service,
wherein the wireless service provider deposits the number of units of wireless service or the monetary value of wireless service associated with the request to obtain additional wireless services that includes the number of units of wireless service or the monetary value of wireless service, in an account associated with the wireless subscriber;

wherein the wireless service provider being different from a wireless network operator that operates the wireless network;

wherein the wireless device comprises a smartphone; and wherein the wireless services comprise voice service, Short Message Service messaging service, and data service.

14. The wireless device of claim 13, further comprising:

coordinate by the tracking module implemented by the wireless service provider and the tracking module implemented by the wireless device at least one of the following: provisioning, metering, accumulating, and consolidating wireless service usage; and generate, at the account management application operating on the wireless device, a customer service graphical user interface to provide customer service information and customer service interaction, wherein the request to obtain additional wireless services that includes the number of units of wireless service comprise a request to purchase particular amounts of voice minutes, Short Message Service messages, and data.

15. The wireless device of claim 13, wherein:

the at least one processor is further configured to generate with the account management application operating on the wireless device, a payment graphical user interface for payment of a cost of the wireless service; and the at least one processor is further configured to generate with the account management application operating on the wireless device, a social media graphical user interface to provide a recommendation for the wireless service provider.

16. The wireless device of claim 13, further comprising:

generate, at the account management application operating on the wireless device, an automatic refill set up graphical user interface to implement automatic purchasing of additional wireless service following a trigger event, wherein:

the wireless service usage information includes a number of units of wireless services that the wireless subscriber has used over a first time period, and the other wireless service usage information includes a number of units of wireless services that the wireless subscriber has used over a second time period that is before the first time period.

17. A non-transitory computer program product, the non-transitory computer program product comprising one or more code segments that, when executed by at least one processor implemented by a wireless device, are configured to:

implement an account management application with the wireless device and receiving from a tracking module implemented by a wireless service provider, wireless service usage information for a wireless subscriber associated with the wireless device, the wireless service usage information including a number of units of wireless services that the wireless subscriber has used;

compare, at the account management application operating on the wireless device, the wireless service usage information from the tracking module with wireless service usage information for the wireless device from a tracking module implemented by the wireless device to confirm consistency;

receive, at the account management application operating on the wireless device and from the wireless service provider over a wireless network, account information associated with the wireless subscriber associated with the wireless device that is stored in an account information database implemented by the wireless service provider;

receive, at the account management application operating on the wireless device, an indication that the wireless subscriber has selected to view the wireless service usage information and the account information for the wireless subscriber associated with the wireless device;

enable presentation, on a display of the wireless device, of the account management application that includes the wireless service usage information and the account information for the wireless subscriber associated with the wireless device;

receive, at the account management application operating on the wireless device and from the wireless subscriber associated with the wireless device, a request to obtain additional wireless services through a graphical user interface that includes a number of units of wireless service or a monetary value of wireless service;

forward, from the account management application operating on the wireless device and to the wireless service provider over the wireless network, the request to obtain additional wireless services that includes the number of units of wireless service or the monetary value of wireless service; and deposit, at the wireless service provider, the number of units of wireless service or the monetary value of wireless service associated with the request to obtain additional wireless services, in an account associated with the wireless subscriber, wherein the wireless service provider being different from a wireless network operator that operates the wireless network;

wherein the wireless device comprises a smartphone; and wherein the wireless services comprise voice service, Short Message Service messaging service, and data service.

18. The non-transitory computer program product of claim 17 further comprising coordinating by the tracking module implemented by the wireless service provider and the tracking module implemented by the wireless device at least one of the following: provisioning, metering, accumulating, and consolidating wireless service usage, wherein receiving the indication that the wireless subscriber would like to view the wireless service usage information for the wireless subscriber comprises receiving the indication that the wireless subscriber has selected a button in the account management application.

19. The non-transitory computer program product of claim 17 further comprising:

generating, at the account management application operating on the wireless device, a payment graphical user interface for payment of a cost of the wireless service; and generating, at the account management application operating on the wireless device, a social media graphical user interface to provide a recommendation for the wireless service provider.

20. The non-transitory computer program product of claim 17 further comprising:

receiving, at the account management application operating on the wireless device, advertisement information selected for the wireless subscriber according to the account information associated with the wireless subscriber; and generating, at the account management application operating on the wireless device, an automatic refill set up graphical user interface to implement automatic purchasing of additional wireless service following a trigger event.

* * * * *